US010422636B2

(12) United States Patent
Nakagawa et al.

(10) Patent No.: US 10,422,636 B2
(45) Date of Patent: Sep. 24, 2019

(54) COORDINATE MEASURING MACHINE AND COORDINATE CORRECTION METHOD

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 147 days.

(21) Appl. No.: 15/681,926

(22) Filed: Aug. 21, 2017

(65) Prior Publication Data

US 2018/0058847 A1 Mar. 1, 2018

(30) Foreign Application Priority Data

Aug. 26, 2016 (JP) .................... 2016-166344

(51) Int. Cl.
*G01B 5/008* (2006.01)
*G01B 21/04* (2006.01)
(Continued)

(52) U.S. Cl.
CPC .......... *G01B 21/045* (2013.01); *G01B 5/008* (2013.01); *G01B 5/012* (2013.01); *G01B 21/042* (2013.01); *G01B 21/047* (2013.01); *G06F 17/16* (2013.01)

(58) Field of Classification Search
CPC .................... G01B 3/12; G01B 5/02
(Continued)

(56) References Cited

U.S. PATENT DOCUMENTS 5,125,261 A 6/1992 Powley
6,909,983 B2 6/2005 Sutherland
(Continued)

FOREIGN PATENT DOCUMENTS

DE           4325602 C1    9/1994
DE    102011053117 A1    3/2012
(Continued)

OTHER PUBLICATIONS

Office Action issued in European Patent Office (EPO) family member Patent Appl. No. 17187937.2, dated Nov. 21, 2018.
(Continued)

*Primary Examiner* — George B Bennett
(74) *Attorney, Agent, or Firm* — Greenblum & Bernstein, P.L.C.

(57) ABSTRACT

A processing device includes: a pushing drive mechanism control unit that brings a measurement tip into contact with a surface of a calibration artifact at a single point in each of five directions are all normal directions to the surface of the calibration artifact; a scanning drive mechanism control unit that reciprocates the measurement tip on the surface of the calibration artifact on each of three planes perpendicular to one another; a coordinate acquisition unit that acquires a moving amount and a probe output of a measuring probe; a matrix generation unit that generates a correction matrix; and a probe output correction unit that corrects the probe output with the correction matrix. This enables an improvement in asymmetric probe characteristics of the probe output, which is outputted from the measuring probe, in a particular plane. Thus, shape coordinates of an object to be measured can be obtained with high accuracy.

6 Claims, 11 Drawing Sheets

(51) Int. Cl.
*G01B 5/012* (2006.01)
*G06F 17/16* (2006.01)

(58) Field of Classification Search
USPC .......................................................... 33/503
See application file for complete search history.

(56) References Cited

U.S. PATENT DOCUMENTS

| | | | |
|---|---|---|---|
| 7,131,207 | B2 | 11/2006 | McFarland |
| 7,353,616 | B2 | 4/2008 | Matsumoto et al. |
| 7,885,777 | B2 | 2/2011 | Jonas et al. |
| 7,900,367 | B2 | 3/2011 | Sutherland |
| 7,913,537 | B2 | 3/2011 | Petterson |
| 8,825,427 | B2 | 9/2014 | Kunzmann et al. |
| 8,983,795 | B2 | 3/2015 | Lotze et al. |
| 9,091,522 | B2 | 7/2015 | Nakagawa et al. |
| 9,097,504 | B2 | 8/2015 | Ishikawa et al. |
| 9,459,096 | B2 | 10/2016 | Guasco |
| 9,464,877 | B2 | 10/2016 | Nakagawa et al. |
| 9,683,839 | B2 | 6/2017 | Nakagawa et al. |
| 9,719,779 | B2 | 8/2017 | Ishikawa et al. |
| 9,746,303 | B2 | 8/2017 | Nakagawa et al. |
| 2010/0132432 | A1* | 6/2010 | Wallace .............. G01B 21/045 73/1.75 |
| 2011/0161046 | A1 | 6/2011 | Chang et al. |
| 2012/0084989 | A1* | 4/2012 | Pettersson ............ G01B 21/045 33/503 |
| 2014/0071460 | A1* | 3/2014 | Suzuki .................. G01B 5/008 356/614 |
| 2014/0259715 | A1* | 9/2014 | Engel .................. G01B 11/007 33/503 |
| 2015/0241194 | A1 | 8/2015 | Nakagawa et al. |
| 2016/0131470 | A1* | 5/2016 | Ishikawa .............. G01B 21/045 33/503 |
| 2017/0248400 | A1 | 8/2017 | Koga et al. |
| 2017/0248402 | A1 | 8/2017 | Koga et al. |

FOREIGN PATENT DOCUMENTS

| | | |
|---|---|---|
| EP | 2172735 A2 | 4/2010 |
| EP | 2543955 A1 | 1/2013 |
| EP | 2733460 A1 | 5/2014 |
| EP | 2910895 A1 | 8/2015 |
| JP | H02-284216 A | 11/1990 |
| JP | 2002-528709 A | 9/2002 |
| JP | 2004-108959 A | 4/2004 |
| JP | 2004-521343 A | 7/2004 |
| JP | 2005-181293 A | 7/2005 |
| JP | 2006-329795 A | 12/2006 |
| JP | 2007-183184 A | 7/2007 |
| JP | 2008-539408 A | 11/2008 |
| JP | 2009-516195 A | 4/2009 |
| JP | 2009-534681 A | 9/2009 |
| JP | 2010-145211 A | 7/2010 |
| JP | 2011-503628 A | 1/2011 |
| JP | 2013-015464 A | 1/2013 |
| JP | 5297787 B2 | 9/2013 |
| JP | 2015-158387 A | 9/2015 |
| JP | 2016-090434 A | 5/2016 |
| WO | 02/073128 A1 | 9/2002 |
| WO | 2004/051179 A1 | 6/2004 |
| WO | 2007/058610 A1 | 5/2007 |

OTHER PUBLICATIONS

Office Action issued in Japan family member Patent Appl. No. 2016-166343, dated Feb. 13, 2018, along with an English translation thereof.
Office Action issued in Japan family member Patent Appl. No. 2016-166344, dated Feb. 13, 2018, along with an English translation thereof.
U.S. Appl. No. 15/680,653 to Hideyuki Nakagawa et al., which was filed on Aug. 18, 2017.
U.S. Appl. No. 15/682,904 to Hideyuki Nakagawa et al., which was filed on Aug. 22, 2017.
Official Communication issued in European Patent Office (EPO) Patent Application No. 17187463.9, dated Jan. 3, 2018.
Official Communication issued in European Patent Office (EPO) Patent Application No. 17187937.2, dated Jan. 3, 2018.
Official Communication issued in European Patent Office (EPO) Patent Application No. 17187935.6, dated Jan. 16, 2018.
Notice of Reasons for Rejection issued in Japanese family member Patent Appl. No. 2016-166343, dated Mar. 28, 2019, along with an English translation thereof.

* cited by examiner

COORDINATE MEASURING MACHINE AND COORDINATE CORRECTION METHOD

CROSS-REFERENCE TO RELATED APPLICATION

The disclosure of Japanese Patent Application No. 2016-166344 filed on Aug. 26, 2016 including specifications, drawings and claims is incorporated herein by reference in its entirety.

TECHNICAL FIELD

The present invention relates to a coordinate measuring machine and a coordinate correction method, and more particularly, to a coordinate measuring machine and a coordinate correction method that can improve asymmetric probe characteristics of a probe output, which is supplied from a measuring probe, in a particular plane and thus enable the obtainment of shape coordinates of an object to be measured with high accuracy.

BACKGROUND ART

A conventionally known coordinate measuring machine includes: a measuring probe that movably supports a stylus having a measurement tip (contact member) to be brought into contact with an object to be measured and provides a probe output according to a displacement of the measurement tip; a drive mechanism that holds and moves the measuring probe; and a processing device that computes shape coordinates of the object to be measured on the basis of the probe output and a moving amount of the measuring probe by the drive mechanism. This processing device can compute shape coordinates $\{x, y, z\}^T$ (referred to as "XX") shown in Formula (1) by adding a moving amount $\{x_m, y_m, z_m\}^T$ (referred to as "M") of the measuring probe by the drive mechanism in an machine coordinate system, which is a coordinate system of the coordinate measuring machine, and a probe output $\{x_p, y_p, z_p\}^T$ (referred to as "P") in a probe coordinate system, which is a coordinate system of the measuring probe.

$$\begin{Bmatrix} x \\ y \\ z \end{Bmatrix} = \begin{Bmatrix} x_m \\ y_m \\ z_m \end{Bmatrix} + \begin{Bmatrix} x_p \\ y_p \\ z_p \end{Bmatrix} \quad \text{Formula (1)}$$

To reduce errors resulting from discrepancy between the machine coordinate system and the probe coordinate system, pressing drive for driving the measuring probe so that the measurement tip is brought into contact with a surface of a calibration artifact at a single point and scanning drive for driving the measuring probe so that the measurement tip scans the surface of the calibration artifact are performed in Japanese Patent Application Laid-Open No. 2015-158387 (hereinafter, referred to as Patent Literature 1). Patent Literature 1 has proposed a method in which the moving amount and the probe output of the measuring probe are acquired (a pressing measurement and a scanning measurement are performed), and a correction matrix A is obtained on the basis of the moving amount M and the probe output P of the measuring probe. With the obtained correction matrix A, the probe output P can be transformed into a transformed output $\{x_{p\_m}, y_{p\_m}, z_{p\_m}\}^T$ (referred to as "PM") in the machine coordinate system as shown in Formula (2). Thereafter, the shape coordinates XX can be computed by adding the moving amount M of the measuring probe and the transformed output PM as shown in Formula (3).

$$\begin{Bmatrix} x_{p\_m} \\ y_{p\_m} \\ z_{p\_m} \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} x_p \\ y_p \\ z_p \end{Bmatrix} \quad \text{Formula (2)}$$

$$\begin{Bmatrix} x \\ y \\ z \end{Bmatrix} = \begin{Bmatrix} x_m \\ y_m \\ z_m \end{Bmatrix} + \begin{Bmatrix} x_{p\_m} \\ y_{p\_m} \\ z_{p-m} \end{Bmatrix} \quad \text{Formula (3)}$$

Where $\begin{bmatrix} A_{11} & A_{12} & A_{13} \\ A_{23} & A_{22} & A_{23} \\ A_{33} & A_{32} & A_{33} \end{bmatrix}$ : Correction matrix $A$ Note that reference characters $A_{11}$ to $A_{33}$ represent correction elements that constitute the correction matrix A, and correct coordinate components of the probe output P.

SUMMARY OF INVENTION

Technical Problem

The pressing measurement in Patent Literature 1, however, is performed only on one end side in three directions of X, Y, and Z in the spherical calibration artifact, for example. However, in the case of the X direction, for example, displacement characteristics of the measurement tip toward the plus side do not necessarily coincide with displacement characteristics of the measurement tip toward the minus side in the measuring probe. Furthermore, demand for enhanced sensitivity in measuring probes has been increasing in recent years. Thus, with the correction matrix obtained in Patent Literature 1, there is a possibility of being unable to correct the symmetricity of change characteristics (also referred to as probe characteristics) of the measurement tip sufficiently, thus making it difficult to obtain the shape coordinates of the object to be measured with high accuracy.

The present invention has been made in order to solve the above-described problems in the conventional technique, and an object thereof is to provide a coordinate measuring machine and a coordinate correction method that can improve asymmetric probe characteristics of a probe output, which is outputted from a measuring probe, in a particular plane and thus enable the obtainment of shape coordinates of an object to be measured with high accuracy.

Solution to Problem

To solve the above-described problems, an aspect of the present invention provides a coordinate measuring machine including: a measuring probe for movably supporting a stylus having a measurement tip to be brought into contact with an object to be measured and for providing a probe output according to a displacement of the measurement tip; a drive mechanism for moving the measuring probe relative to the object to be measured; and a processing device for computing shape coordinates of the object to be measured on the basis of the probe output and a moving amount of the measuring probe by the drive mechanism. The coordinate measuring machine includes a calibration artifact with which the measurement tip is brought into contact. The processing device includes: a pushing drive mechanism control unit for controlling the drive mechanism to bring the measurement tip into contact with a surface of the calibration artifact at a single point in each of five directions so that the five directions including three directions perpendicular to one another, and two directions among the three directions adding a respective inversed direction, are all normal directions to the surface of the calibration artifact, to push the calibration artifact with the measurement tip by a predetermined displacement amount, and then to move the measurement tip in an opposite direction to separate the measurement tip away from the surface; a scanning drive mechanism control unit for controlling the drive mechanism to reciprocate the measurement tip on the surface of the calibration artifact while pressing the calibration artifact with the measurement tip by a constant deflection amount on each of three planes perpendicular to one another; a coordinate acquisition unit for acquiring the moving amount and the probe output of the measuring probe when the measurement tip engages with the calibration artifact by the pushing drive mechanism control unit and the scanning drive mechanism control unit; a matrix generation unit for generating a correction matrix for correcting the probe output with respect to the moving amount of the measuring probe on the basis of an output of the coordinate acquisition unit; and a probe output correction unit for correcting the probe output with the correction matrix.

A second aspect of the present invention provide the above-described coordinate measuring machine, wherein the five directions include: an axial direction of the stylus; two directions perpendicular to each other in a plane perpendicular to the axial direction; and two directions having measurement forces opposite to those of the two directions perpendicular to each other.

A third aspect of the present invention provides the above-described coordinate measuring machine, wherein the drive mechanism includes an X-axis drive mechanism, a Y-axis drive mechanism, and a Z-axis drive mechanism for moving the measuring probe, and when the axial direction coincides with a moving direction of any one of the X-axis drive mechanism, the Y-axis drive mechanism, and the Z-axis drive mechanism, two moving directions of the remaining drive mechanisms and the two directions perpendicular to each other in the plane perpendicular to the axial direction are shifted from each other by an angle of 45 degrees.

A fourth aspect of the present invention provides a coordinate correction method of a coordinate measuring machine, the coordinate measuring machine including: a measuring probe for movably supporting a stylus having a measurement tip to be brought into contact with an object to be measured and for providing a probe output according to a displacement of the measurement tip; a drive mechanism for moving the measuring probe relative to the object to be measured; and a processing device for computing shape coordinates of the object to be measured on the basis of the probe output and a moving amount of the measuring probe by the drive mechanism. The coordinate correction method includes: a pushing drive step of controlling the drive mechanism to bring the measurement tip into contact with a surface of a calibration artifact at a single point in each of five directions so that the five directions including three directions perpendicular to one another, and two directions among the three directions adding a respective inversed direction, are all normal directions to the surface of the calibration artifact, to push the calibration artifact with the measurement tip by a predetermined displacement amount, and then to move the measurement tip in an opposite direction to separate the measurement tip away from the surface; a scanning drive step of controlling the drive mechanism to reciprocate the measurement tip on the surface of the calibration artifact while pressing the calibration artifact with the measurement tip by a constant deflection amount on each of three planes perpendicular to one another; a step of acquiring the moving amount and the probe output of the measuring probe when the measurement tip engages with the calibration artifact in the pushing drive step and the scanning drive step; a step of generating, on the basis of the acquired moving amount and the acquired probe output of the measuring probe, a correction matrix for correcting the probe output with respect to the moving amount of the measuring probe; and a step of correcting the probe output with the correction matrix.

Advantageous Effects of Invention

According to the present invention, since the asymmetric probe characteristics of the probe output, which is supplied from the measuring probe, in a particular plane can be improved, the shape coordinates of the object to be measured can be obtained with high accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will be described below in detail with reference to the drawings.

A first embodiment of a coordinate measuring machine according to the present invention will now be described with reference to FIGS. 1 to 9B.

A general configuration of a coordinate measuring machine 100 will be described first.

Figure 1:
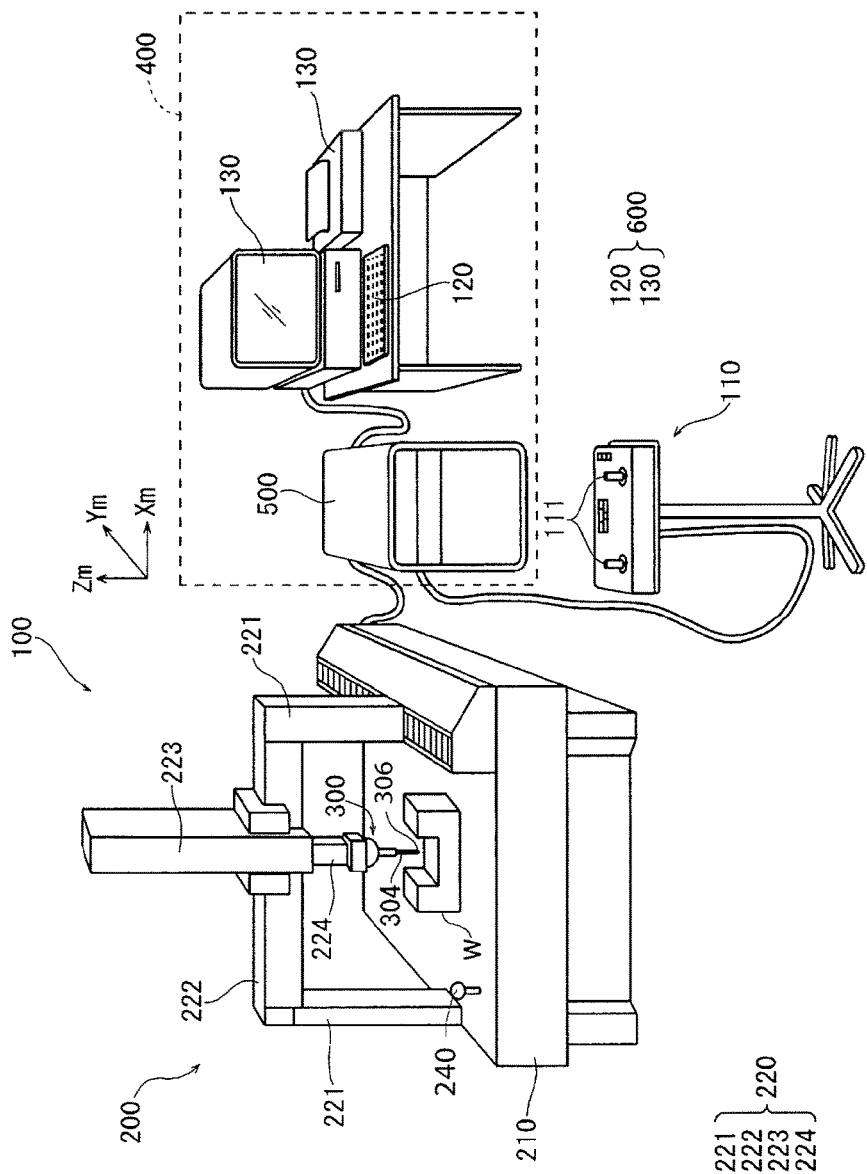
FIG. 1 is a schematic view showing an example of a coordinate measuring machine according to a first embodiment of the present invention.

As shown in FIG. 1, the coordinate measuring machine 100 includes: a machine body 200 that moves a measuring probe 300; operation unit 110 having manually-operated joysticks 111; and a processing device 400.

As shown in FIG. 1, the machine body 200 includes: a surface plate 210; a drive mechanism 220; a calibration artifact 240; and the measuring probe 300. The drive mechanism 220 includes an X-axis drive mechanism 225, a Y-axis drive mechanism 226, and a Z-axis drive mechanism 227 (FIG. 2) that are provided to stand on the surface plate 210 for holding and three-dimensionally moving the measuring probe 300 as shown in FIG. 1. Note that the drive mechanism is not limited thereto. For example, a drive mechanism may three-dimensionally move an object W to be measured by fixing the measuring probe and moving the surface plate itself which is positioned under the object W to be measured, or moving a member positioned on the surface plate and under the object W to be measured. Alternatively, a drive mechanism may three-dimensionally move both of the measuring probe and the object W to be measured. In other words, the drive mechanism may be any mechanism capable of moving the measuring probe relative to the object W to be measured.

Figure 2:
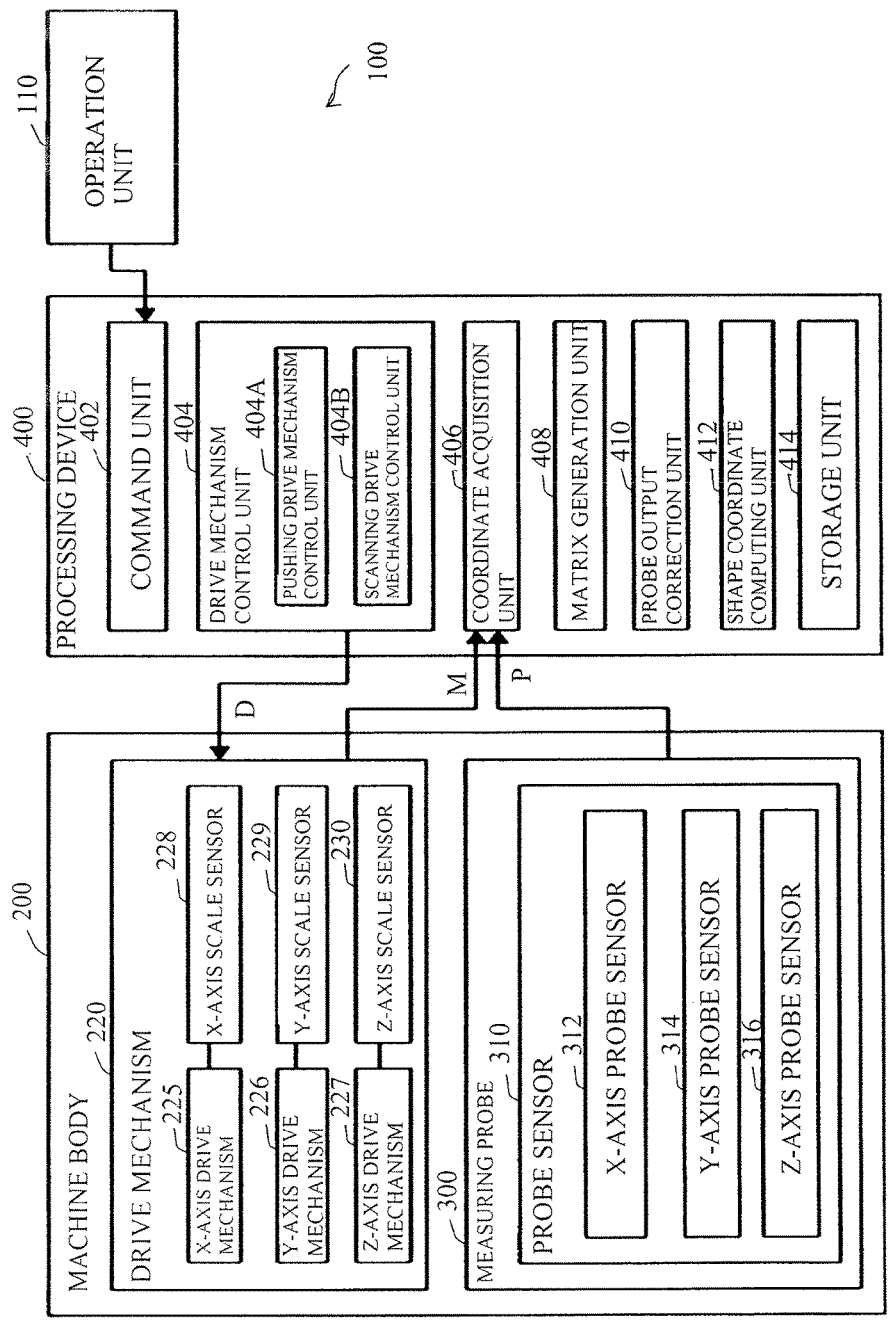
FIG. 2 is a block diagram of the coordinate measuring machine of FIG. 1.

Specifically, the drive mechanism 220 includes: beam supports 221 capable of moving in a Ym direction in an machine coordinate system; a beam 222 bridged between the beam supports 221; a column 223 capable of moving in an Xm direction in the machine coordinate system on the beam 222; and a spindle 224 capable of moving in a Zm direction in the machine coordinate system inside the column 223 as shown in FIG. 1. The X-axis drive mechanism 225, the Y-axis drive mechanism 226, and the Z-axis drive mechanism 227 shown in FIG. 2 are provided between the beam 222 and the column 223, between the surface plate 210 and the beam supports 221, and between the column 223 and the spindle 224, respectively. The measuring probe 300 is supported by an end of the spindle 224.

As shown in FIG. 2, the X-axis drive mechanism 225, the Y-axis drive mechanism 226, and the Z-axis drive mechanism 227 are provided with an X-axis scale sensor 228, a Y-axis scale sensor 229, and a Z-axis scale sensor 230, respectively. Thus, a moving amount $\{x_m, y_m, z_m\}^T$ (referred to as "M") of the measuring probe 300 in the machine coordinate system can be obtained from outputs of the X-axis scale sensor 228, the Y-axis scale sensor 229, and the Z-axis scale sensor 230. In the present embodiment, the moving directions of the X-axis drive mechanism 225, the Y-axis drive mechanism 226, and the Z-axis drive mechanism 227 coincide with the Xm direction, the Ym direction, and the Zm direction in the machine coordinate system, respectively.

As shown in FIG. 1, the calibration artifact 240 is a spherical member (also referred to as a reference sphere) and disposed on the surface plate 210. Since the calibration artifact 240 is a spherical member, all normal lines to the surface of the calibration artifact 240 pass through the center of the calibration artifact 240.

Figure 3:
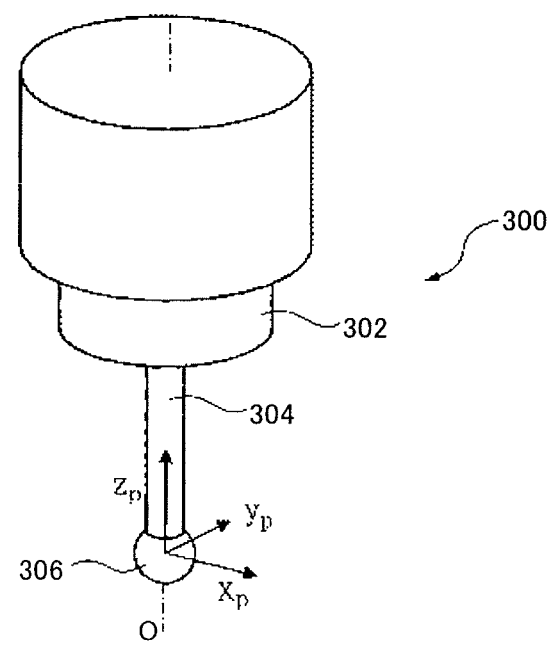
FIG. 3 is a perspective view showing a measuring probe of the coordinate measuring machine of FIG. 1.

The measuring probe 300 is what is called a scanning probe. As shown in FIG. 3, the measuring probe 300 movably supports a stylus 304, which has a spherical measurement tip 306 to be brought into contact with the object W to be measured, by a probe body 302. The measuring probe 300 provides a probe output $\{x_p, y_p, z_p\}^T$ (referred to as "P") according to a displacement of the measurement tip 306. Here, the stylus 304 is supported by a spring structure that gives a non-linear response, for example, in the probe body 302. A displacement of the stylus 304 in the measuring probe 300 is detected by a probe sensor 310.

As shown in FIG. 2, the probe sensor 310 includes: an X-axis probe sensor 312 for detecting a displacement of the measurement tip 306 in an Xp direction (FIG. 3) in a probe coordinate system; a Y-axis probe sensor 314 for detecting a displacement of the measurement tip 306 in a Yp direction in the probe coordinate system; and a Z-axis probe sensor 316 for detecting a displacement of the measurement tip 306 in a Zp direction in the probe coordinate system. Thus, the probe output P, i.e., coordinates of the measurement tip 306 in the probe coordinate system, can be obtained from the outputs of the X-axis probe sensor 312, the Y-axis probe sensor 314, and the Z-axis probe sensor 316. Note that the X-axis probe sensor 312, the Y-axis probe sensor 314, and the Z-axis probe sensor 316 may not directly indicate the probe output P.

As shown in FIG. 2, the operation unit 110 is connected to a command unit 402 of the processing device 400. Various commands can be inputted to the machine body 200 and the processing device 400 via the operation unit 110.

As shown in FIG. 1, the processing device 400 includes a motion controller 500 and a host computer 600. The processing device 400 computes shape coordinates XX of the object W to be measured on the basis of the probe output P and the moving amount M of the measuring probe 300 by the drive mechanism 220. The motion controller 500 mainly controls the movement and measurement of the measuring probe 300. The host computer 600 mainly processes measured results obtained in the machine body 200. In the present embodiment, the processing device 400 having a combined function of the motion controller 500 and the host computer 600 is shown in the block diagram of FIG. 2 and will be described below. The host computer 600 includes input unit 120 such as a keyboard and output unit 130 such as a display and a printer.

As shown in FIG. 2, the processing device 400 includes: the command unit 402, a drive mechanism control unit 404, a coordinate acquisition unit 406, a matrix generation unit 408, a probe output correction unit 410, a shape coordinate computing unit 412, and a storage unit 414.

The command unit 402 shown in FIG. 2 gives predetermined commands to the drive mechanism control unit 404 on the basis of commands inputted by the operation unit 110 or the input unit 120. The command unit 402 generates, as a positional command to the drive mechanism 220, a coordinate value in the machine coordinate system for each control cycle in consideration of, for example, moving directions, moving distances, moving speeds, and the like to move the measuring probe 300 to a plurality of positions (measurement points). For example, the command unit 402 may also issue a command about timing for acquiring both of the moving amount M of the measuring probe 300 by the drive mechanism 220 and the probe output P or the number of such acquisitions (the number n of measurement points) to the coordinate acquisition unit 406.

The drive mechanism control unit 404 shown in FIG. 2 can perform drive control by outputting a drive control signal D in response to a command from the command unit 402 and thereby passing an electric current through motors of the X-axis, Y-axis, and Z-axis drive mechanisms 225, 226, and 227 in the drive mechanism 220. Specifically, the drive mechanism control unit 404 includes a pushing drive mechanism control unit 404A and a scanning drive mechanism control unit 404B.

Figure 6A:
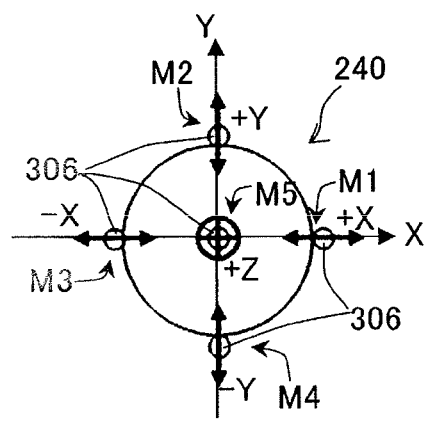
FIG. 6A is a top view showing positional relationships between a measurement tip and a calibration artifact when the pushing measurements of FIG. 5 are performed.

The pushing drive mechanism control unit 404A causes the drive mechanism 220 to perform a pushing drive step of: bringing the measurement tip 306 into contact with the surface of the calibration artifact 240 at a single point in each of five normal directions to the surface of the calibration artifact 240; pushing the calibration artifact 240 with the measurement tip 306 by a predetermined displacement amount; and then moving the measurement tip 306 in the opposite direction to separate the measurement tip 306 away from the surface. For example, the five directions in the pushing drive mechanism control unit 404A refer to: three directions perpendicular to one another (the three directions of X, Y, and Z); and two directions (the X direction and the Y direction) among such three directions adding (having) a respective inversed direction (i.e., in each of the two directions, the directions of the measurement forces are opposite to each other; a +X direction and a −X direction in the X direction, and a +Y direction and a −Y direction in the Y direction) as shown in FIG. 6A.

Figure 9A:
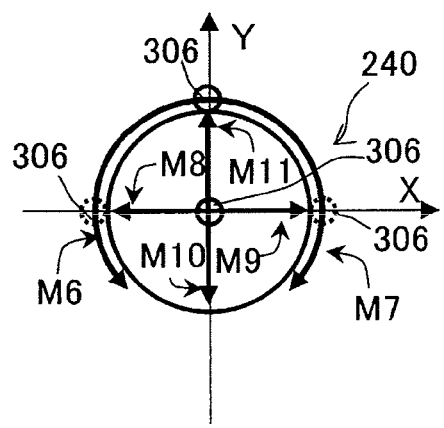
FIG. 9A is a top view showing positional relationships between the measurement tip and the calibration artifact when the scanning measurements of FIG. 8 are performed.
Figure 9B:
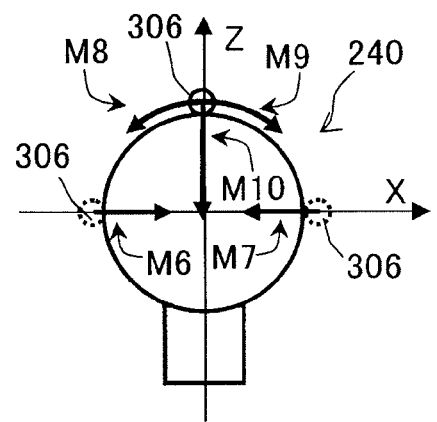
FIG. 9B is a side view showing the positional relationships between the measurement tip and the calibration artifact when the scanning measurements of FIG. 8 are performed.

The scanning drive mechanism control unit 404B controls the drive mechanism 220 to perform a scanning drive step of reciprocating the measurement tip 306 on the surface of the calibration artifact 240 while pressing the calibration artifact 240 with the measurement tip 306 by a constant deflection amount (obtained by the probe output P) on each of three planes perpendicular to one another. The three planes in the scanning drive mechanism control unit 404B are an X-Y plane, an X-Z plane, and a Y-Z plane, for example, as shown in FIGS. 9A and 9B. On each of the planes, the measurement tip 306 moves clockwise and counterclockwise along the surface of the calibration artifact 240 by the scanning drive mechanism control unit 404B.

In the present embodiment, each of the X direction, the Y direction, and the Z direction is a normal direction to the surface of the calibration artifact 240, and the Z direction coincides with an axial direction O of the stylus 304. More specifically, the five directions in the pushing drive mechanism control unit 404A include: the axial direction O of the stylus 304; two directions perpendicular to each other in a plane perpendicular to the axial direction O; and two directions having measurement forces opposite to those of the two directions perpendicular to each other. Thus, the X direction, the Y direction, and the Z direction coincide with the Xm direction, the Ym direction, and the Zm direction in the machine coordinate system, respectively. While the three directions of X, Y, and Z in the pushing drive mechanism control unit 404A and the three directions of X, Y, and Z in the scanning drive mechanism control unit 404B have the same notations for the sake of convenience, these directions may be shifted from each other. The drive mechanism control unit 404 also controls the drive mechanism 220 to obtain the center of the calibration artifact 240.

When the measurement tip 306 engages (is in contact) with the calibration artifact 240 by the pushing drive mechanism control unit 404A and the scanning drive mechanism control unit 404B, the coordinate acquisition unit 406 shown in FIG. 2 acquires the moving amount M of the measuring probe 300 in the machine coordinate system, which is outputted from the drive mechanism 220, and the probe output P in the probe coordinate system, which is outputted from the probe sensor 310. Acquiring the moving amount M and the probe output P of the measuring probe 300 when the measurement tip 306 engages with the calibration artifact 240 in the pushing drive step performed by the pushing drive mechanism control unit 404A is hereinafter referred to as a "pushing measurement." Acquiring the moving amount M and the probe output P of the measuring probe 300 when the measurement tip 306 engages with the calibration artifact 240 in the scanning drive step performed by the scanning drive mechanism control unit 404B is hereinafter referred to as a "scanning measurement."

The coordinate acquisition unit 406 computes the acquired data into a form required by the matrix generation unit 408 (the number of data pieces and a data form) and outputs the result to the matrix generation unit 408 (such computation may be performed in the matrix generation unit 408 and the coordinate acquisition unit 406 may only acquire the probe output P and the moving amount M of the measuring probe 300). Specifically, the coordinate acquisition unit 406 outputs a moving amount Mn and a probe output Pn of the measuring probe 300 corresponding to the number n of measurement points (the number of acquisitions) necessary to generate a correction matrix AA by the pushing measurements and the scanning measurements. For example, the number n of the measurement points equals 5p+4q, which is the sum of 5p (p is an integer larger than or equal to 1) derived from the five directions in the pushing measurements and 4q (q is an integer larger than or equal to 1) derived from the reciprocation on the three planes in the scanning measurements (corresponding to a total of four rounds (of the calibration artifact 240) in the case of 360 degrees on the X-Y plane and about 180 degrees on each of the X-Z plane and the Y-Z plane as shown in FIGS. 9A and 9B). If no correction matrix AA is generated in the matrix generation unit 408, the coordinate acquisition unit 406 directly outputs the probe output P and the moving amount M of the measuring probe 300 to the probe output correction unit 410 and the shape coordinate computing unit 412 respectively without changing their forms.

The matrix generation unit 408 shown in FIG. 2 generates the correction matrix AA on the basis of the outputs (the moving amount Mn and the probe output Pn of the measuring probe 300) of the coordinate acquisition unit 406. When the measurement tip 306 and the calibration artifact 240 are in contact with each other, a distance between a center $\{x_{pm}, y_{pm}, z_{pm}\}^T$ (referred to as "PX") of the measurement tip 306 in the machine coordinate system, which is obtained by using the correction matrix AA, and a center $\{x_c, y_c, z_c\}^T$ (referred to as "PC") of the calibration artifact 240 ideally coincides with the sum R of a radius of a measurement sphere of the measurement tip 306 and a radius of the reference sphere, i.e., the calibration artifact 240 (referred to as a distance between the measurement tip 306 and the calibration artifact 240). In reality, however, in the i-th ($1 \leq i \leq n$) output of the coordinate acquisition unit 406, a distance between a center $\{x_{pmi}, y_{pmi}, z_{pmi}\}^T$ (referred to as "$PX_i$") of the measurement tip 306 and the center PC of the calibration artifact 240 and the distance R between the measurement tip 306 and the calibration artifact 240 have a distance error $f_i(E)$ as shown in Formulas (4) and (5). A moving amount $M_i$ of the measuring probe 300 and a probe output $P_i$, which are the i-th ($1 \leq i \leq n$) output, are denoted as $\{x_{mi}, y_{mi}, z_{mi}\}^T$ and $\{x_{pi}, y_{pi}, z_{pi}\}^T$, respectively. A variable E represents $\{AA_{11}, AA_{12}, AA_{13}, AA_{21}, AA_{22}, AA_{23}, AA_{31}, AA_{32}, AA_{33}, x_c, y_c, z_c, R\}^T$.

$$f_i(E) = |PXi - PC| - R \quad \text{Formula (4)}$$

$$f_i(E) = \left| \left\{ \begin{array}{c} x_{mi} \\ y_{mi} \\ z_{mi} \end{array} \right\} + \begin{bmatrix} AA_{11} & AA_{12} & AA_{13} \\ AA_{21} & AA_{22} & AA_{23} \\ AA_{31} & AA_{32} & AA_{33} \end{bmatrix} \left\{ \begin{array}{c} x_{pi} \\ y_{pi} \\ z_{pi} \end{array} \right\} - \left\{ \begin{array}{c} x_c \\ y_c \\ z_c \end{array} \right\} \right| - R \quad \text{Formula (5)}$$

Where $$\text{Center } PXi \text{ of measurement tip 306:} \left\{ \begin{array}{c} x_{pmi} \\ y_{pmi} \\ z_{pmi} \end{array} \right\} = \left\{ \begin{array}{c} x_{mi} \\ y_{mi} \\ z_{mi} \end{array} \right\} + \begin{bmatrix} AA_{11} & AA_{12} & AA_{13} \\ AA_{23} & AA_{22} & AA_{23} \\ AA_{33} & AA_{32} & AA_{33} \end{bmatrix} \left\{ \begin{array}{c} x_{pi} \\ y_{pi} \\ z_{pi} \end{array} \right\}$$

$$\text{Correction matrix } AA:: \begin{bmatrix} AA_{11} & AA_{12} & AA_{13} \\ AA_{21} & AA_{22} & AA_{23} \\ AA_{31} & AA_{32} & AA_{33} \end{bmatrix}$$

Here, the correction matrix AA includes correction elements for correcting coordinate components of the probe output P with respect to the moving amount M of the measuring probe 300. Note that the coordinate components refer to the first-order coordinate components $x_p$, $y_p$, and $z_p$. The correction elements refer to elements $AA_{11}$, $AA_{12}$, $AA_{13}$, $AA_{21}$, $AA_{22}$, $AA_{23}$, $AA_{31}$, $AA_{32}$, and $AA_{33}$ by which the coordinate components $x_p$, $y_p$, and $z_p$ are multiplied.

An evaluation function J(E) for evaluating the distance error $f_i(E)$ will now be shown in Formula (6).

$$J(E) = \sum_{i=1}^{n} f_i^2(E) \quad \text{Formula (6)}$$

More specifically, the matrix generation unit 408 can calculate the correction elements $AA_{11}$, $AA_{12}$, $AA_{13}$, $AA_{21}$, $AA_{22}$, $AA_{23}$, $AA_{31}$, $AA_{32}$, and $AA_{33}$ of the correction matrix AA by calculating the variable E to minimize the evaluation function J(E) shown in Formula (6) by the non-linear least-squares method, for example. A general solution, such as the Levenberg-Marquardt method, can be employed in this calculation.

The probe output correction unit 410 shown in FIG. 2 corrects the probe output P acquired by the coordinate acquisition unit 406 with the correction matrix AA outputted from the matrix generation unit 408. More specifically, the probe output correction unit 410 obtains a transformed output $\{x_{p\_m}, y_{p\_m}, z_{p\_m}\}^T$ (referred to as "PM") in the machine coordinate system by correcting the probe output P with the correction matrix AA as shown in Formula (7).

$$\{PM\} = [AA]\{P\} \quad \text{Formula (7)}$$

$$\left\{ \begin{array}{c} x_{p\_m} \\ y_{p\_m} \\ z_{p\_m} \end{array} \right\} = \begin{bmatrix} AA_{11} & AA_{12} & AA_{13} \\ AA_{21} & AA_{22} & AA_{23} \\ AA_{31} & AA_{32} & AA_{33} \end{bmatrix} \left\{ \begin{array}{c} x_p \\ y_p \\ z_p \end{array} \right\} \quad \text{Formula (8)}$$

As shown in Formula (9), the shape coordinate computing unit 412 shown in FIG. 2 computes the shape coordinates XX of the object W to be measured at the time of its measurement by adding the transformed output PM supplied from the probe output correction unit 410 to the moving amount M of the measuring probe 300 acquired by the coordinate acquisition unit 406. The shape coordinate computing unit 412 can also obtain the center PC of the calibration artifact 240 from the moving amount M and the probe output P of the measuring probe 300 acquired by the coordinate acquisition unit 406.

$$\{X\} = \{M\} + \{PM\} \quad \text{Formula (9)}$$

The storage unit 414 shown in FIG. 2 stores initial values for various types of control, initial values for various types of processing, and programs, for example. The storage unit 414 also stores the correction matrix AA generated by the matrix generation unit 408 and the center PC of the calibration artifact 240 obtained by the shape coordinate computing unit 412. Note that the storage unit 414 can also store CAD data on the object W to be measured or the calibration artifact 240, for example.

Next, a general procedure of coordinate correction according to the present embodiment will be described below mainly with reference to FIG. 4.

First, the calibration artifact 240 is fixed at a predetermined position on the surface plate 210 in a measurement space. Thereafter, the measurement tip 306 is brought into contact with the calibration artifact 240 to obtain the center PC of the calibration artifact 240 (Step S2 in FIG. 4). Specifically, the measuring probe 300 is moved by the drive mechanism control unit 404, and on the basis of the moving amount M and the probe output P of the measuring probe 300 acquired by the coordinate acquisition unit 406, the center PC of the calibration artifact 240 is obtained by the shape coordinate computing unit 412. The center PC is stored in the storage unit 414. The reason why the center PC of the calibration artifact 240 is obtained is to utilize such a nature that all normal lines to the surface of the calibration artifact 240 pass through the center PC of the calibration artifact 240.

Figure 4:
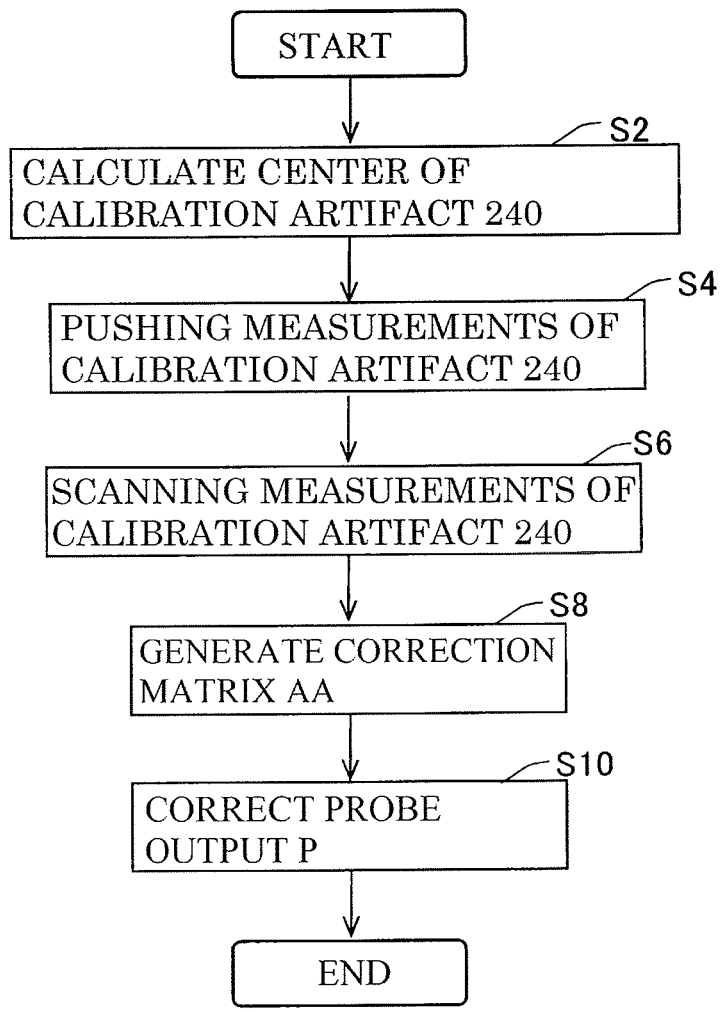
FIG. 4 is a flow chart showing a procedure of performing coordinate correction in the coordinate measuring machine of FIG. 1.

Next, the pushing drive mechanism control unit 404A and the coordinate acquisition unit 406 control the drive mechanism 220 to perform the pushing measurements in the pushing drive step of: bringing the measurement tip 306 into contact with the surface of the calibration artifact 240 at a single point in each of the five directions; pushing the calibration artifact 240 with the measurement tip 306 by a predetermined displacement amount; and then moving the measurement tip 306 in the opposite direction to separate the measurement tip 306 away from the surface (Step S4 in FIG. 4). A total of five directions, i.e., three directions perpendicular to one another and two directions among such three directions adding a respective inversed direction, each of such five directions is set to be normal directions to the surface of the calibration artifact 240. In other words, such five directions pass through the obtained center PC of the calibration artifact 240. A specific procedure of the pushing measurement will be described later.

Next, the scanning drive mechanism control unit 404B and the coordinate acquisition unit 406 control the drive mechanism 220 to perform the scanning measurements in the scanning drive step of reciprocating the measurement tip 306 on the surface of the calibration artifact 240 while pressing the calibration artifact 240 with the measurement tip 306 by a constant deflection amount on each of the three planes (Step S6 in FIG. 4). A route of this scanning measurement is generated in advance on the basis of the obtained center PC of the calibration artifact 240. Note that the three planes are perpendicular to one another. A specific procedure of the scanning measurement will also be described later.

Next, on the basis of the moving amount Mn and the probe output Pn of the measuring probe 300 when the number of the measurement points obtained by the pushing measurements and the scanning measurements is n, the correction matrix AA is generated by the matrix generation unit 408 (Step S8 in FIG. 4).

Next, the probe output P at the time of the measurement of the object W to be measured is corrected with the correction matrix AA in the probe output correction unit 410 to obtain the transformed output PM (Step S10 in FIG. 4). Thereafter, the shape coordinates XX are computed in the shape coordinate computing unit 412 by combining the moving amount M of the measuring probe 300 and the transformed output PM.

The procedure of the pushing measurements will now be described below with reference to FIGS. 5 to 7.

Figure 5:
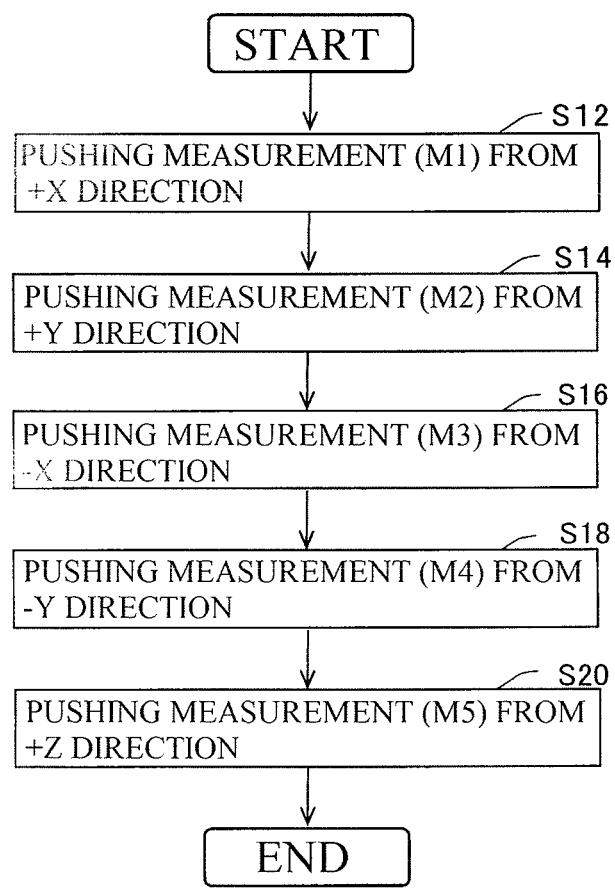
FIG. 5 is a flow chart showing the order of pushing measurements of FIG. 4.
Figure 6B:
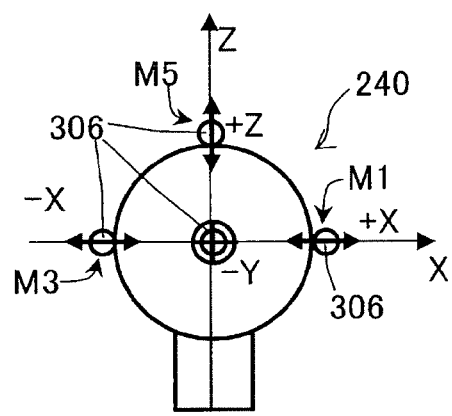
FIG. 6B is a side view showing the positional relationships between the measurement tip and the calibration artifact when the pushing measurements of FIG. 5 are performed.

First, a pushing measurement (M1) is performed against the surface of the calibration artifact 240 in the +X direction (Step S12 in FIG. 5) as shown in FIGS. 6A and 6B. Thereafter, a pushing measurement (M2) is performed against the surface of the calibration artifact 240 in the +Y direction (Step S14 in FIG. 5).

Next, as shown in FIGS. 6A and 6B, a pushing measurement (M3) is performed against the surface of the calibration artifact 240 in the −X direction (which has a measurement force opposite to that of the X direction) (Step S16 in FIG. 5). Thereafter, a pushing measurement (M4) is performed against the surface of the calibration artifact 240 in the −Y direction (which has a measurement force opposite to that of the Y direction) (Step S18 in FIG. 5).

Next, a series of the pushing measurements is completed by performing a pushing measurement (M5) against the surface of the calibration artifact 240 in the +Z direction as shown in FIGS. 6A and 6B (Step S20 in FIG. 5).

A specific procedure of performing the pushing measurement (M1) against the surface of the calibration artifact 240 in the +X direction will now be described below with reference to FIG. 7. Procedures of the pushing measurements performed against the side surfaces of the calibration artifact 240 in directions other than the +X direction are identical with the following procedure except for the directions and the side surfaces of the calibration artifact 240. The description thereof will be therefore omitted.

First, in accordance with the output (the drive control signal D) of the pushing drive mechanism control unit 404A, the measuring probe 300 is moved by the drive mechanism 220 in the −X direction toward the center PC of the calibration artifact 240. More specifically, the pushing drive mechanism control unit 404A moves the measurement tip 306 to approach the −X direction from the normal direction to the surface of the calibration artifact 240 in the +X direction (Step S22 in FIG. 7). Thereafter, it is checked if the measurement tip 306 is in contact with the calibration artifact 240 (Step S24 in FIG. 7). Whether the measurement tip 306 is in contact with the calibration artifact 240 is determined on the basis of whether the probe output P has a change (exceeding a noise level) in the coordinate acquisition unit 406, for example. When the measurement tip 306 is not in contact with the calibration artifact 240 (No in Step S24 in FIG. 7), the movement of the measuring probe 300 in the −X direction toward the center PC of the calibration artifact 240 is continued to move the measurement tip 306 further in the −X direction. Note that whether the measurement tip 306 is in contact with the calibration artifact 240 may be checked by: calculating coordinates of the surface of the calibration artifact 240 in the +X direction with an initial setting value of the distance R between the measurement tip 306 and the calibration artifact 240 and the center PC of the calibration artifact 240, which are stored in the storage unit 414; and then comparing the coordinates with the command from the command unit 402 by the pushing drive mechanism control unit 404A. Alternatively, whether the measurement tip 306 is in contact with the calibration artifact 240 may be checked by comparing the initial setting value stored in the storage unit 414 with the moving amount M of the measuring probe 300 in the machine coordinate system, which is outputted from the drive mechanism 220, by the pushing drive mechanism control unit 404A.

Figure 7:
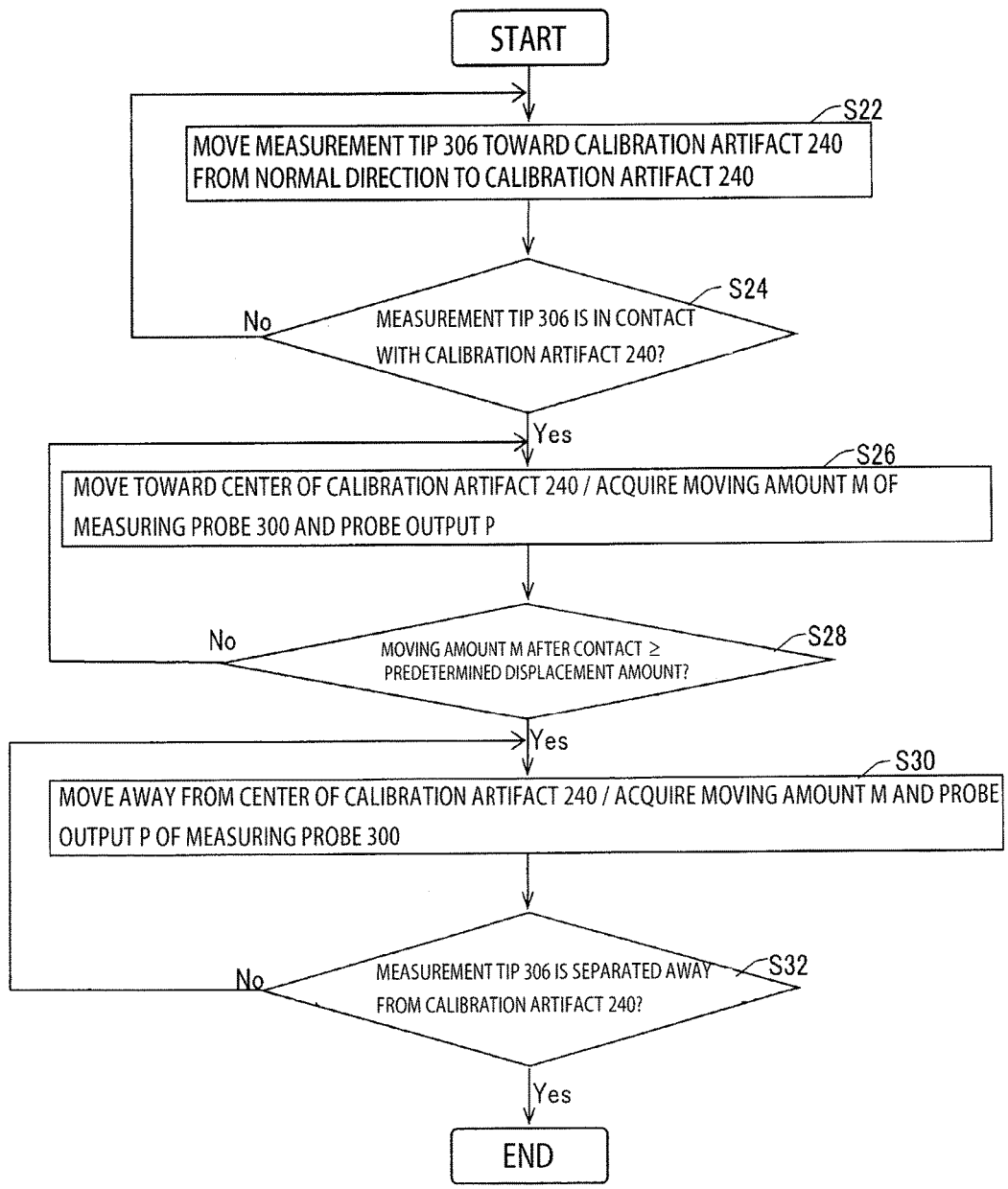
FIG. 7 is a flow chart showing a procedure of the pushing measurement of FIG. 4 in one direction.

When the measurement tip 306 is in contact with the calibration artifact 240 (Yes in Step S24 in FIG. 7), the coordinate acquisition unit 406 starts to acquire the moving amount M and the probe output P of the measuring probe 300 (Step S26 in FIG. 7). Note that the movement of the measuring probe 300 by the drive mechanism 220 in the −X direction toward the center PC of the calibration artifact 240 is still continued.

Next, it is checked if the moving amount M of the measuring probe 300 after the contact is larger than or equal to the predetermined displacement amount in the coordinate acquisition unit 406 (Step S28 in FIG. 7). When the moving amount M of the measuring probe 300 after the contact is smaller than the predetermined displacement amount (No in Step S28 in FIG. 7), the movement of the measuring probe 300 by the drive mechanism 220 in the −X direction toward the center PC of the calibration artifact 240 is still continued. Note that whether the moving amount M of the measuring probe 300 after the contact is larger than or equal to the predetermined displacement amount may be checked on the basis of a predetermined deflection amount in the probe output P, which corresponds to the predetermined displacement amount. Alternatively, whether the moving amount M of the measuring probe 300 after the contact is larger than or equal to the predetermined displacement amount may be checked by: calculating coordinates of the surface of the calibration artifact 240 in the +X direction with the initial setting value of the distance R between the measurement tip 306 and the calibration artifact 240 and the center PC of the calibration artifact 240, which are stored in the storage unit 414; and then comparing coordinates obtained by subtracting the predetermined displacement amount in the −X direction from the calculated coordinates with the command from the command unit 402 by the pushing drive mechanism control unit 404A. Note that the predetermined displacement amount is set to be larger than the expected deflection amount in the probe output P at the time of the measurement of the object W to be measured.

When the moving amount M of the measuring probe 300 after the contact becomes larger than or equal to the predetermined displacement amount (Yes in Step S28 in FIG. 7), the pushing drive mechanism control unit 404A stops the movement of the measuring probe 300 in the −X direction toward the center PC of the calibration artifact 240. Thereafter, the pushing drive mechanism control unit 404A starts to move the measuring probe 300 in a direction opposite to the −X direction (i.e., the +X direction away from the center PC of the calibration artifact 240) (Step S30 in FIG. 7). Note that the acquisition of the moving amount M and the probe output P of the measuring probe 300 is continued.

Next, it is checked if the measurement tip 306 is separated away from the calibration artifact 240 (Step S32 in FIG. 7). Whether such separation has occurred is determined on the basis of whether the probe output P no longer has a change (exceeding the noise level) in the coordinate acquisition unit 406, for example. When the measurement tip 306 is in contact with the calibration artifact 240 (No in Step S32 in FIG. 7), the movement of the measuring probe 300 in the +X direction away from the center PC of the calibration artifact 240 is continued. Whether the measurement tip 306 is separated away from the calibration artifact 240 may be checked by: calculating coordinates of the surface of the calibration artifact 240 in the +X direction with the initial setting value of the distance R between the measurement tip 306 and the calibration artifact 240 and the center PC of the calibration artifact 240, which are stored in the storage unit 414; and then comparing the calculated coordinates with the command from the command unit 402 by the pushing drive mechanism control unit 404A. Alternatively, whether the measurement tip 306 is separated away from the calibration artifact 240 may be checked by comparing the initial setting value stored in the storage unit 414 with the moving amount M of the measuring probe 300 in the machine coordinate system, which is outputted from the drive mechanism 220, by the pushing drive mechanism control unit 404A.

When the measurement tip 306 is separated away from the calibration artifact 240 (Yes in Step S32 in FIG. 7), the acquisition of the moving amount M and the probe output P of the measuring probe 300 is stopped. The pushing measurement (M1) of the measurement tip 306 from the +X direction is thus ended.

Next, the procedure of the scanning measurements will be described below with reference to FIGS. 8, 9A, and 9B.

Figure 8:
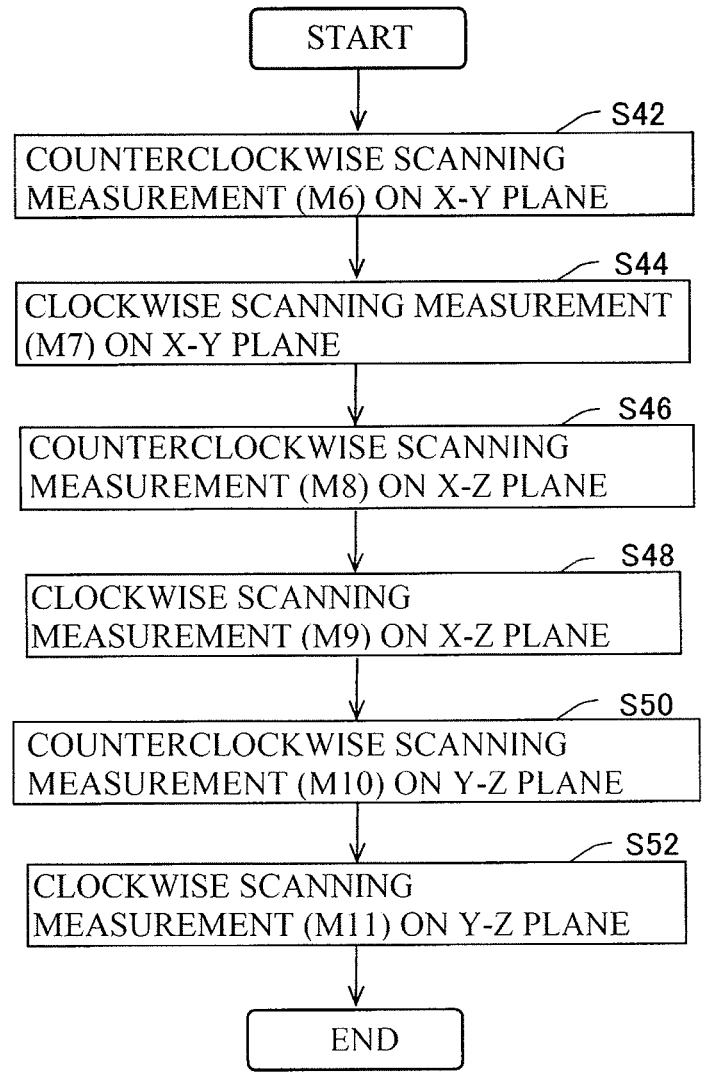
FIG. 8 is a flow chart showing the order of scanning measurements in FIG. 4.

First, a scanning measurement (M6) is performed counterclockwise on the X-Y plane by bringing the measurement tip 306 into contact with the surface of the calibration artifact 240 with a constant deflection amount in the probe output P as shown in FIGS. 9A and 9B (Step S42 in FIG. 8). Thereafter, while keeping the constant deflection amount, a scanning measurement (M7) is performed clockwise on the X-Y plane (Step S44 in FIG. 8). A larger angular range over which such a scanning measurement is performed is more preferred. On the X-Y plane, such an angular range can be set to 360 degrees. Note that the constant deflection amount herein refers to an average deflection amount in the probe output P, which is expected at the time of the measurement of the object W to be measured (the same applies hereinafter).

Next, a scanning measurement (M8) is performed counterclockwise on the X-Z plane by bringing the measurement tip 306 into contact with the surface of the calibration artifact 240 with the same constant deflection amount as shown in FIGS. 9A and 9B (Step S46 in FIG. 8). Thereafter, while keeping the constant deflection amount, a scanning measurement (M9) is performed clockwise on the X-Z plane (Step S48 in FIG. 8). Similarly, a larger angular range over which such a scanning measurement is performed is more preferred. In reality, however, the angular range can be, at most, of about 180 degrees on the X-Z plane (the same applies to the Y-Z plane).

Next, a scanning measurement (M10) is performed counterclockwise on the Y-Z plane by bringing the measurement tip 306 into contact with the surface of the calibration artifact 240 with the same constant deflection amount as shown in FIGS. 9A and 9B (Step S50 in FIG. 8). Thereafter, a series of the scanning measurements is ended by performing a scanning measurement (M11) clockwise on the Y-Z plane while keeping the constant deflection amount (Step S52 in FIG. 8).

As described above, the calibration artifact 240 in the present embodiment is a conventionally-used spherical reference sphere. Thus, the coordinate measuring machine 100 can be prevented from increasing its cost.

According to the present embodiment, the pushing measurements are performed in a total of five directions, i.e., three directions perpendicular to one another and two directions among such three directions adding a respective inversed direction. More specifically, the five directions are: the Z direction corresponding to the axial direction O of the stylus 304; the +X direction and the −X direction in the X direction; and the +Y direction and the −Y direction in the Y direction. Therefore, even when asymmetric probe characteristics are exhibited on the X-Y plane, coordinate correction can be performed so that symmetric probe characteristics are exhibited between the plus side and the minus side of the origin of the stylus 304 on the X-Y plane.

According to the present embodiment, not only the results of the pushing measurements but also the results of the scanning measurements, which cause the reciprocating movements, are used to perform the coordinate correction. Thus, correction required in an actual scanning measurement of the measuring probe 300 can be performed accurately. Furthermore, due to the reciprocating movement of the measurement tip 306 in this scanning measurement, correction compensating for the influence of frictional force can be performed.

In other words, the asymmetric probe characteristics of the probe output P, which is supplied from the measuring probe 300, in the X-Y plane can be improved in the present embodiment. Thus, the shape coordinates XX of the object W to be measured can be obtained with high accuracy.

While the present invention has been described with reference to the first embodiment, the present invention is not limited to the first embodiment. In other words, modifications and variations in design can be effected without departing from the scope of the present invention.

Figure 10A:
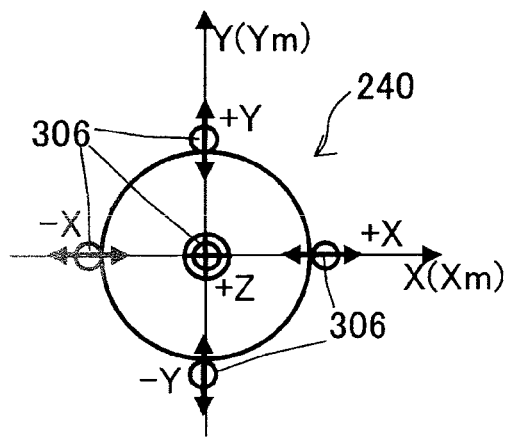
FIG. 10A is a top view showing positional relationships between the measurement tip and the calibration artifact when the pushing measurements according to the first embodiment of the present invention are performed.

For example, while the X direction, the Y direction, and the Z direction perfectly coincide with the Xm direction, the Ym direction, and the Zm direction in the machine coordinate system, respectively, in the first embodiment as shown in FIG. 10A, the present invention is not limited thereto. For example, the present invention may be configured as in a second embodiment shown in FIG. 10B. In the following description, already-described elements will be denoted by the same reference numerals as in the first embodiment, and the description thereof will be omitted.

Figure 10B:
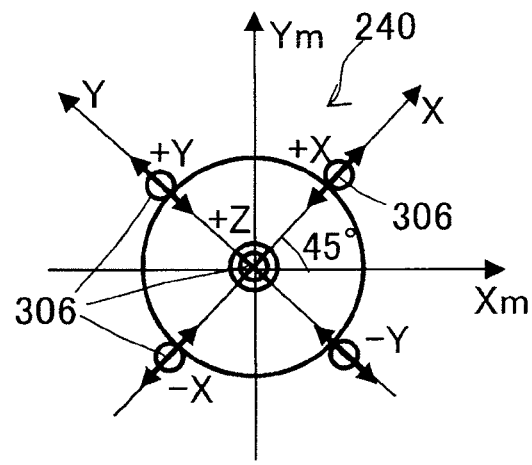
FIG. 10B is a top view showing positional relationships between a measurement tip and a calibration artifact when pushing measurements according to a second embodiment of the present invention are performed.

As with the first embodiment, an axial direction O of a stylus 304 coincides with the moving direction of a Z-axis drive mechanism 227 in the second embodiment as shown in FIG. 10B. In other words, a Z direction coincides with a Zm direction in a machine coordinate system. An X direction and a Y direction, however, are shifted from the moving directions (an Xm direction and a Ym direction) of an X-axis drive mechanism 225 and a Y-axis drive mechanism 226, respectively, by an angle of 45 degrees.

Thus, the present embodiment can not only yield advantageous effects similar to those in the first embodiment but also effectively acquire the number of moving amounts M and probe outputs P of a measuring probe 300 necessary to generate a correction matrix AA. (For example, when the measuring probe 300 is moved precisely in the Xm direction in the pushing measurement (M1) of the first embodiment, a displacement of the measuring probe 300 in the Ym direction is always zero. The moving amount M and the probe output P acquired at this time may be inconvenient to be used as an effective result to obtain the correction matrix AA for correcting a coordinate component $y_p$ of the probe output P. In the present embodiment, however, the aforementioned angle is shifted by 45 degrees as compared to the first embodiment. This can prevent a displacement in the Xm direction or the Ym direction from being always zero. Thus, the acquired moving amount M and the acquired probe output P can be used as an effective result to obtain the correction matrix AA for correcting coordinate components $x_p$ and $y_p$ of the probe output P.) In other words, the step of the pushing measurements can be reduced in the present embodiment, and thus the correction matrix AA can be obtained more quickly. In the present embodiment, the X direction (Y direction) is shifted from the Xm direction (Ym direction) by an angle of 45 degrees. Thus, if the moving amount M of the measuring probe 300 is increased by a factor of √2 as compared to the first embodiment, the number of the effective results to obtain the correction matrix AA doubles. As a result of the averaging effect of the moving amount M and the probe output P of the measuring probe 300, the influence of measurement variation in the pushing measurements can be reduced by a factor of 1/√2. Note that the present invention is not limited thereto. When the axial direction O of the stylus 304 coincides with the moving direction of the X-axis drive mechanism 225 or the Y-axis drive mechanism 226, two moving directions of the remaining drive mechanisms and two directions perpendicular to each other in a plane perpendicular to the axial direction O of the stylus 304 may be shifted from each other by an angle of 45 degrees.

Figure 11A:
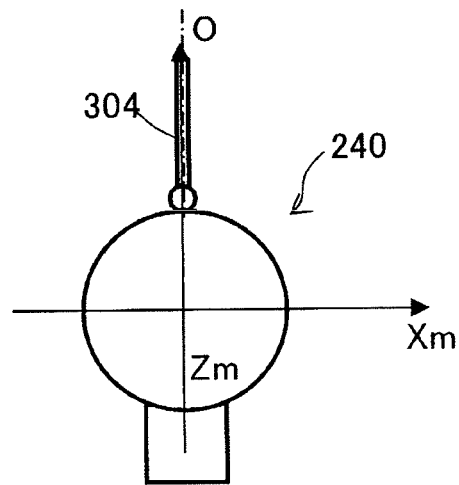
FIG. 11A is a side view showing a relationship between the calibration artifact and an attitude of a stylus according to the first embodiment of the present invention.
Figure 11B:
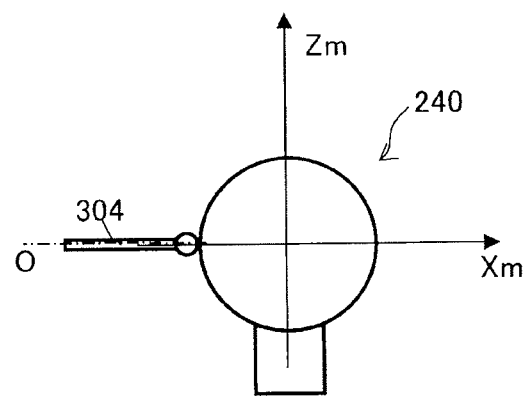
FIG. 11B is a side view showing a relationship between a calibration artifact and an attitude of a stylus according to a third embodiment of the present invention.

While the Z direction, corresponding to the axial direction O of the stylus 304, coincides with the Zm direction in the machine coordinate system in the above embodiments as shown in FIG. 11A, the present invention is not limited thereto. For example, an axial direction O of a stylus 304 may coincide with an Xm direction in an machine coordinate system as shown in a third embodiment of FIG. 11B. In this case, probe characteristics can be corrected symmetrically on a Ym-Zm plane.

Figure 11C:
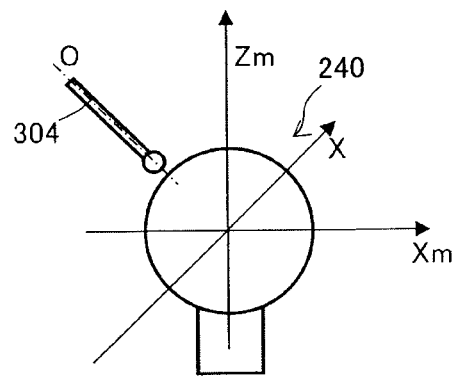
FIG. 11C is a side view showing a relationship between a calibration artifact and an attitude of a stylus according to a fourth embodiment of the present invention.

Alternatively, an axial direction O of a stylus 304 may not coincide with any direction in a machine coordinate system as shown in a fourth embodiment of FIG. 11C. In this case, probe characteristics can be corrected symmetrically on a plane perpendicular to the axial direction O of the stylus 304 (the plane indicated by an arrow in an X direction in FIG. 11C).

While the calibration artifact 240 is the spherical reference sphere in the present embodiment, the present invention is not limited thereto. For example, the calibration artifact may be formed in the shape of a circular cylinder, a rectangular column, a polygonal column, or the like, including a recess in a central portion of such a column.

The present invention can be applied to a wide variety of coordinate measuring machines for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A coordinate measuring machine comprising:
    a measuring probe that movably supports a stylus having a measurement tip to be brought into contact with an object to be measured, and that provides a probe output according to a displacement of the measurement tip;
    a driver that moves the measuring probe relative to the object to be measured;
    a calibration artifact with which the measurement tip is brought into contact; and
    a processor that computes shape coordinates of the object to be measured on a basis of the probe output and a moving amount of the measuring probe by the driver, wherein the processor comprises, as a configuration when the processor executes instructions stored in a memory:
        a pushing driver controller that controls the driver to bring the measurement tip into contact with a surface of the calibration artifact at a single point in each of five directions so that the five directions including three directions perpendicular to one another, and two directions among the three directions adding a respective inversed direction, are all normal directions to the surface of the calibration artifact, to push the calibration artifact with the measurement tip by a predetermined displacement amount, and then to move the measurement tip in an opposite direction to separate the measurement tip away from the surface;
        a scanning driver controller that controls the driver to reciprocate the measurement tip on the surface of the calibration artifact while pressing the calibration artifact with the measurement tip by a constant deflection amount on each of three planes perpendicular to one another;
        a coordinate acquisition processor that acquires the moving amount and the probe output of the measuring probe when the measurement tip engages with the calibration artifact by the pushing driver controller and the scanning driver controller;
        a matrix generator that generates a correction matrix for correcting the probe output with respect to the moving amount of the measuring probe on a basis of an output of the coordinate acquisition processor; and
        a probe output corrector that corrects the probe output with the correction matrix.

2. The coordinate measuring machine according to claim 1, wherein the five directions include: an axial direction of the stylus; two directions perpendicular to each other in a plane perpendicular to the axial direction; and two directions having measurement forces opposite to those of the two directions perpendicular to each other.

3. The coordinate measuring machine according to claim 2, wherein:
    the driver includes an X-axis driver, a Y-axis driver, and a Z-axis driver that move the measuring probe, and
    when the axial direction coincides with a moving direction of any one of the X-axis driver, the Y-axis driver, and the Z-axis driver, two moving directions of the remaining drivers and the two directions perpendicular to each other in the plane perpendicular to the axial direction are shifted from each other by an angle of 45 degrees.

4. A coordinate correction method of a coordinate measuring machine, the coordinate measuring machine including: a measuring probe for movably supporting a stylus having a measurement tip to be brought into contact with an object to be measured and for providing a probe output according to a displacement of the measurement tip; a drive mechanism for moving the measuring probe relative to the object to be measured; and a processing device for computing shape coordinates of the object to be measured on a basis of the probe output and a moving amount of the measuring probe by the drive mechanism, the coordinate correction method comprising:

a first controlling of the drive mechanism to bring the measurement tip into contact with a surface of a calibration artifact at a single point in each of five directions so that the five directions including three directions perpendicular to one another, and two directions among the three directions adding a respective inversed direction, are all normal directions to the surface of the calibration artifact, to push the calibration artifact with the measurement tip by a predetermined displacement amount, and then to move the measurement tip in an opposite direction to separate the measurement tip away from the surface;

a second controlling of the drive mechanism to reciprocate the measurement tip on the surface of the calibration artifact while pressing the calibration artifact with the measurement tip by a constant deflection amount on each of three planes perpendicular to one another;

acquiring the moving amount and the probe output of the measuring probe when the measurement tip engages with the calibration artifact in the first and second controlling of the drive mechanism;

generating, on a basis of the acquired moving amount and the acquired probe output of the measuring probe, a correction matrix for correcting the probe output with respect to the moving amount of the measuring probe; and correcting the probe output with the correction matrix.

5. The coordinate correction method according to claim 4, wherein the five directions include: an axial direction of the stylus; two directions perpendicular to each other in a plane perpendicular to the axial direction; and two directions having measurement forces opposite to those of the two directions perpendicular to each other.

6. The coordinate correction method according to claim 5, wherein:

the drive mechanism includes an X-axis drive mechanism, a Y-axis drive mechanism, and a Z-axis drive mechanism for moving the measuring probe, and when the axial direction coincides with a moving direction of any one of the X-axis drive mechanism, the Y-axis drive mechanism, and the Z-axis drive mechanism, two moving directions of the remaining drive mechanisms and the two directions perpendicular to each other in the plane perpendicular to the axial direction are shifted from each other by an angle of 45 degrees.

* * * * *